(12) United States Patent
Kainuma et al.

(10) Patent No.: US 7,313,930 B2
(45) Date of Patent: Jan. 1, 2008

(54) METHOD AND APPARATUS FOR MANUFACTURING GLASS SUBSTRATE FOR STORAGE MEDIUM

(75) Inventors: Kengo Kainuma, Nagano (JP); Tatsumi Kawata, Nagano (JP); Kunio Hibino, Osaka (JP); Tomokazu Tokunaga, Hyogo (JP)

(73) Assignees: Fuji Electric Device Technology Co., Ltd, Tokyo (JP); Matsushita Electric Industrial Co. Ltd, Osaka (JP)

( * ) Notice: Subject to any disclaimer, the term of this patent is extended or adjusted under 35 U.S.C. 154(b) by 616 days.

(21) Appl. No.: 10/725,446

(22) Filed: Dec. 3, 2003

(65) Prior Publication Data

US 2004/0134232 A1  Jul. 15, 2004

(30) Foreign Application Priority Data

Dec. 4, 2002 (JP) .............................. 2002-352540
Nov. 25, 2003 (JP) .............................. 2003-394581

(51) Int. Cl.
C03B 11/00 (2006.01)
C03B 11/06 (2006.01)

(52) U.S. Cl. .............................. 65/102; 65/127; 65/275

(58) Field of Classification Search .................... 65/85, 65/127, 102, 106, 305, 64, 275, 319, 157, 65/32.1, 162, 273
See application file for complete search history.

(56) References Cited

U.S. PATENT DOCUMENTS 3,973,942 A   8/1976  Coen et al.
5,160,362 A * 11/1992 Yamamoto et al. ............ 65/102
5,215,566 A *  6/1993 Yamamoto et al. ......... 65/29.12
5,382,274 A *  1/1995 Yamamoto et al. ............. 65/26
5,788,732 A *  8/1998 Nomura et al. ................. 65/64
5,855,641 A *  1/1999 Taniguchi ..................... 65/286
6,070,436 A *  6/2000 Hirota et al. ................... 65/64
2002/0054976 A1  5/2002 Nakamura et al.

(Continued)

FOREIGN PATENT DOCUMENTS

EP        0 474 473 A2     3/1992

(Continued)

OTHER PUBLICATIONS

Austrian Search and Examination Report dated Sep. 22, 2006, issued in Singaporean Patent Application No. 200307141-2.

*Primary Examiner*—Carlos Lopez
(74) *Attorney, Agent, or Firm*—Venable LLP; Michael A. Sartori; Catherine M. Voorhees (57) ABSTRACT

A method of manufacturing a glass substrate for a storage medium by pressing a glass material between an upper and a lower dies. The method includes a heating step of heating the glass material arranged between the upper and lower dies, a pressing step of pressing the heated glass material via the upper and lower dies, and a cooling step of having, after the pressing step, a cooling member contact the upper and lower dies to cool them together with the molded glass material arranged between the upper and lower dies. During the heating step and the pressing step, a vacuum atmosphere is maintained in a space containing the dies and the glass material. When the pressing step has completed, an inert gas is filled in the space to set a pressure in the space equal to an ambient pressure.

5 Claims, 6 Drawing Sheets

U.S. PATENT DOCUMENTS

2003/0234471 A1 * 12/2003 Kuroiwa et al. ............ 264/320
2005/0178157 A1 * 8/2005 Yoneda ...................... 65/32.1

FOREIGN PATENT DOCUMENTS

| JP | 63-045137 | | 2/1988 |
| JP | 63-095131 | | 4/1988 |
| JP | 02-055240 | | 2/1990 |
| JP | 02092834 A | * | 4/1990 |
| JP | 04-037613 | | 2/1992 |
| JP | 10-330121 | | 12/1998 |
| JP | 2000-063132 | | 2/2000 |
| JP | 2000-351635 | | 12/2000 |
| JP | 2002-187727 | | 7/2002 |
| JP | 2003277081 A | * | 10/2003 |
| JP | 2004026540 A | * | 1/2004 |
| JP | 2006056724 A | * | 3/2006 |
| JP | 2006096604 A | * | 4/2006 |

* cited by examiner

METHOD AND APPARATUS FOR MANUFACTURING GLASS SUBSTRATE FOR STORAGE MEDIUM

This application claims priority from Japanese Patent Application Nos. 2002-352540 and 2003-394581 filed Dec. 4, 2002 and Nov. 25, 2003, respectively, which are incorporated hereinto by reference.

BACKGROUND OF THE INVENTION

1. Field of the Invention

The present invention relates to a method and apparatus for manufacturing glass substrate suitable for storage medium such as magnetic disk, storage medium and glass substrate therefor manufactured using the method or apparatus.

2. Description of the Related Art

A glass substrate for a magnetic disk has hitherto been manufactured with a lapping/polishing method where a substrate of a predetermined size is lapped and polished so as to obtain a smooth surface. However, in recent years, it has been desired to increase the smoothness of the substrate. Thus, disadvantageously, the lapping/polishing method requires a large number of steps and increases the price of a glass substrate product.

On the other hand, a molding method, where glass material is heated, molded, and cooled to precisely transfer die molding surfaces to the material, does not require any post-working and thus does not require high costs and is highly productive. Therefore, in the field of manufacture of optical elements, many efforts have already been made to improve molding methods and to put them to practical use.

A conventional pressing process used to manufacture optical elements is generally executed as follows. A glass material is set between an upper and lower dies. In order to prevent the dies from being oxidized, the atmosphere of a molding chamber is replaced with an inert gas such as a nitrogen gas, with the molding chamber accommodating the die and the glass material. Subsequently, a heater (an induction heater, a lamp heater, a cartridge heater, or the like) is used to heat the dies and the glass material. Once the temperature reaches a predetermined value, the upper and lower dies are used to press the glass material. Finally, the dies are cooled, and a product is then removed.

For such pressing of an optical element, to prevent defects or oxidation of the dies caused by collected air, a method has been proposed which presses a material in a reduced pressure atmosphere and which blows an inert gas against the dies (refer to, for example, Japanese Patent Application Laying-open No. 10-330121 (1998)).

However, the manufacture of glass substrate for magnetic disks using a molding method involves problems different from those of the pressing of an optical element.

Specifically, while a substrate for a hard disk medium have an area larger than those of optical elements, the waviness of the surface of the substrate has to be minimized (the surface be as flat as possible) notably in a circumferential direction, and the dimensional accuracy of the inner and outer diameters of the substrate be increased. For example, 2.5-inch disks may need to have a flatness of 4 μm or less. Such a requirement is based on the need of improving the flying capability of a magnetic head particularly during a high speed rotation.

With the conventional method of blowing a gas against dies for cooling, it is difficult to cool the dies at a uniform temperature which, in turn, may lead to deformation of the substrate, making it difficult to provide a suitably flat substrate.

On the other hand, a method has been proposed where glass substrates for magnetic disks are manufactured with heating, pressing, and cooling steps performed in chambers separate from one another (refer to, for example, Japanese Patent Application Laying-open No. 2000-351635).

However, when a substrate is conveyed between the number of chambers during a single molding process, a chuck mark may be left on the substrate, and also, the substrate may be distorted.

In view of the above problems of the prior arts, it is an object of the present invention to provide means for suitably producing a high-quality substrate for a storage medium with a molding method.

SUMMARY OF THE INVENTION

To accomplish the above object, the present invention provides a method of manufacturing a glass substrate for a storage medium by arranging and pressing a glass material between an upper die and a lower die to form a glass substrate, the method comprising:

a heating step of heating the glass material remaining arranged between the upper die and the lower die;

a pressing step of pressing the heated glass material via the upper and lower dies to precisely transfer molding surfaces of the upper and lower dies to the glass material to form a desired substrate; and a cooling step of having, after the pressing step, a cooling member contact the upper and lower dies, respectively, to cool the dies with the molded glass material remaining arranged between the upper die and the lower die, and wherein during the heating step and the pressing step, a vacuum atmosphere is maintained in a space containing the dies and the glass material, and wherein when the pressing step has completed, an inert gas is filled in the space to set a pressure in the space equal to an ambient pressure, before the cooling step is executed.

The cooling step may include a step of pressurizing the glass member via the upper die and the lower die until the temperature of the glass material reaches its glass transition point.

Furthermore, according to the present invention, there is provided an apparatus for manufacturing a glass substrate for a storage medium by arranging and pressing a glass material between an upper die and a lower die to form a glass substrate, the apparatus comprising:

heating means for heating the glass material remaining arranged between the upper die and the lower die;

pressing means for pressing the heated glass material via the upper and lower dies to precisely transfer molding surfaces of the upper and lower dies to the glass material to form a desired substrate;

cooling means for having a cooling member contact the upper and lower dies so as to perform cooling of the molded glass material remaining arranged between the upper and lower dies;

accommodating means for accommodating the upper and lower dies, the heating member, and the cooling member; and exhausting and gas filling means for exhausting and filling a gas from and into a space formed by the accommodating means, wherein the exhaust and gas filling means exhausts the gas until the pressing means is used to form a closed space for molding between the upper die and the lower die, and after the pressing means has been used to form the closed space for molding between the upper die and the lower die, an inert gas is filled in the space to set a pressure in the space equal to an ambient pressure, and wherein the cooling means cools the glass material after the inert gas is filled in the space to set the pressure in the space equal to the ambient pressure.

The cooling means may comprise an upper and lower water cooling jackets that can selectively contact with, and separate from, surfaces of the upper and lower dies, respectively, which surfaces are opposite to molding surfaces. In this arrangement, cooling could be performed by having the upper and lower water cooling jackets contact the surfaces of the upper and lower dies, respectively, which surfaces are opposite to the molding surfaces.

Furthermore, the heating means may include a radiating heater arranged around the upper and lower dies.

A glass substrate for a storage medium according to the present invention is characterized in that it is manufactured by the above manufacturing apparatus or method.

A storage medium according to the present invention is characterized in that it comprises the above glass substrate.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Preferred embodiments of the present invention will be described below with reference to the drawings.

Figure 1:
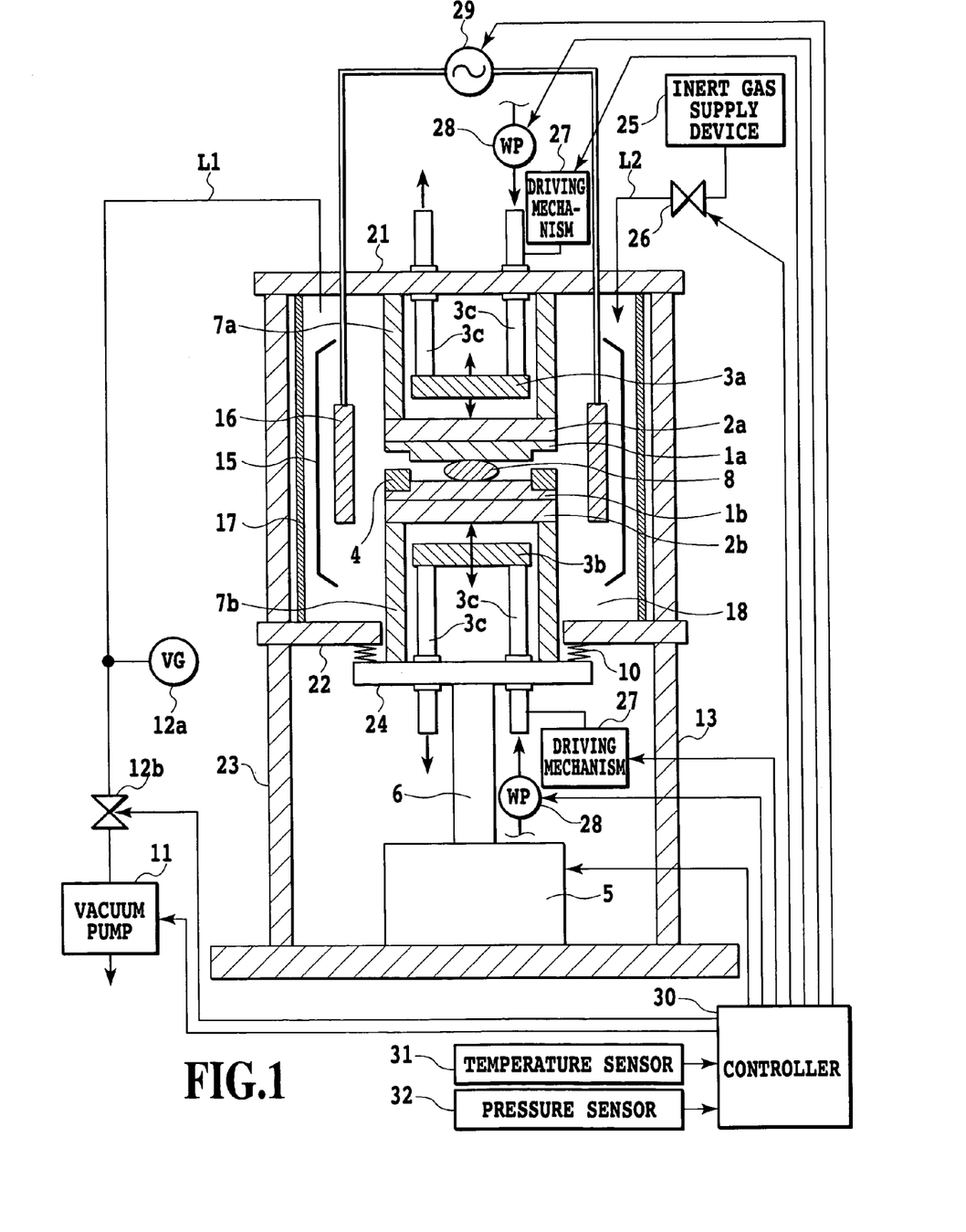
FIG. 1 is a front view showing a manufacturing apparatus according to an embodiment of the present invention.

FIG. 1 shows a glass substrate manufacturing apparatus according to an embodiment of the present invention. This manufacturing apparatus has die fulcrums 7a and 7b that support an upper die 1a and a lower die 1b, respectively, and a press machine 5 that elevates and lowers the die fulcrum 7b.

The apparatus has a frame including an upper plate 21, a fixed stage 22, and struts 13 and 23. A movable stage 24 is provided so as to cover an opening in the fixed stage 22. The upper die fulcrum 7a is fixed to the upper plate 21. The lower die fulcrum 7b is fixed to the movable stage 24. The opening in the fixed stage 22 and the periphery of the movable stage 24 are joined together and sealed by bellows 10.

The movable stage 24 is fixed to a reciprocating rod 6 of the press machine 5. The press machine 5 is a screw jack driven by a servo motor provided inside itself.

The dies 1a and 1b are generally composed of a ceramic material containing tungsten carbide as a main component. Further, formed on molding surfaces (i.e. surfaces contacting glass material) of the dies 1a and 1b are coating layers (not shown) composed of materials having high melting point, e.g. tantalum, iridium or platinum, or alloys thereof. The coating layers are employed to facilitate release from dies and to maintain a precise surface shape of the formed glass substrate. A controlling member 4 is placed on the lower die 1b. The interfaces of the dies 1a and 1b and controlling member 4 are finished to be smooth, so that during pressing, a sealed cavity is formed between the dies 1a and 1b and the controlling member 4.

A tube heater 16 is installed in opposition to the side surfaces of the dies 1a and 1b. Flat heaters 2a and 2b are installed on the back surfaces of the upper and lower dies 1a and 1b, respectively, to heat the dies and adjust temperature balance. A reflector 15 is installed around the tube heater 16 to facilitate efficient thermal radiation.

The tube heater 16 is a radiating heater of an electric resistance heating type suitable for heating in a vacuum. The tube heater 16 is preferably a ceramic heater mainly composed of alumina, zirconia, aluminum nitride, or boron nitride, a graphite heater, or a Ni—Cr heater. The tube heater 16 preferably has a capability of heating the dies 1a and 1b to a temperature higher than a molding temperature (from the glass transition temperature to the temperature close to the softening point of a glass material), preferably at least 200° C. higher than the molding temperature from a view of reliability of the heater.

The flat heaters 2a and 2b are of an electric resistance heating type suitable for heating in a vacuum. Each of the flat heaters 2a and 2b has a capacity smaller than the tube heater 16.

A cylindrical shell 17 is installed so as to connect the upper plate 21 and the fixed stage 22 together. A chamber 18 as accommodating means is defined by the upper plate 21, the fixed stage, the movable stage 24, the shell 17, and the bellows 10. The chamber 18 accommodates constituent members such as the dies 1a and 1b, the flat heaters 2a and 2b, and water cooling jackets 3a and 3b which will be described later.

A vacuum pump 11 is connected to the chamber 18 via a vacuum suction line L1 as exhaust and gas filling means for exhausting to vacuum and helps to rapidly fill the chamber with an inert gas. The vacuum pump 11 is activated to form a vacuum of about 1 Pa in the chamber 18. A vacuum gauge 12a, a valve 12b, and the like are also connected to the vacuum suction line L1.

An inert gas supply device 25 is also connected to the chamber 18 via an inert gas supply line L2. A valve 26 is provided in the supply line L2 to supply the interior of the chamber 18 with an inert gas such as an N2 gas when it opens.

The water cooling jackets 3a and 3b as cooling members constituting cooling means are mainly composed of blocks consisting of a metal material such as copper which well conducts heat. Channels are provided inside each block. Water pumps 28 are used to supply cooling water to the channel in each of the water cooling jackets 3a and 3b via the struts 3c being pipes, thereby the water cooling jackets 3a and 3b are maintained at a uniform temperature (cooling water temperature).

Driving mechanisms 27 are operatively connected to the strut 3c to elevate and lower the water cooling jackets 3a and 3b. Each of the driving mechanisms 27 may include, for example, a servo motor. As a result, the water cooling jackets 3a and 3b can selectively contact with, and separate from, the flat heaters 2a and 2b, respectively. While the water cooling jackets 3a and 3b contact with the flat heaters 2a and 2b, respectively, the dies 1a and 1b and the glass material 8 are cooled to enhance the uniformity of their respective in-plane temperatures more uniform.

The flat heaters 2a and 2b are provided with a temperature sensor 31 to monitor the temperatures of the dies 1a and 1b.

A controller 30 is provided to control each section of the manufacturing apparatus. The controller 30 is a well-known microcomputer system. Input ports of the controller 30 connect to the temperature sensor 31 for detecting the temperatures of the dies 1a and 1b, a pressure sensor 32 provided in the chamber 18, and various other sensors including those for detecting the operating positions, pressures, and temperatures of the parts of the apparatus. Furthermore, output ports of the controller 30 connect to various actuators such as the vacuum pump 11 and valve 12b for controlling exhaustion from the chamber 18, the valve 26 for controlling the supply of an inert gas, the driving mechanism 27 for elevating and lowering the water cooling jackets 3a and 3b, a power supply device 29 for feeding electricity to the tube heater 16, the press machine 5, and the water pump 28.

The controller 30 performs calculation processes on the basis of an operator's inputs from input devices (not shown), signal inputs from the various sensors, and programs stored in a storage section. On the basis of the results of the calculation processes, the controller 30 outputs control signals for the various actuators.

Now, description will be given of a molding process using the manufacturing apparatus.

(1) Heating Step

Figure 2:
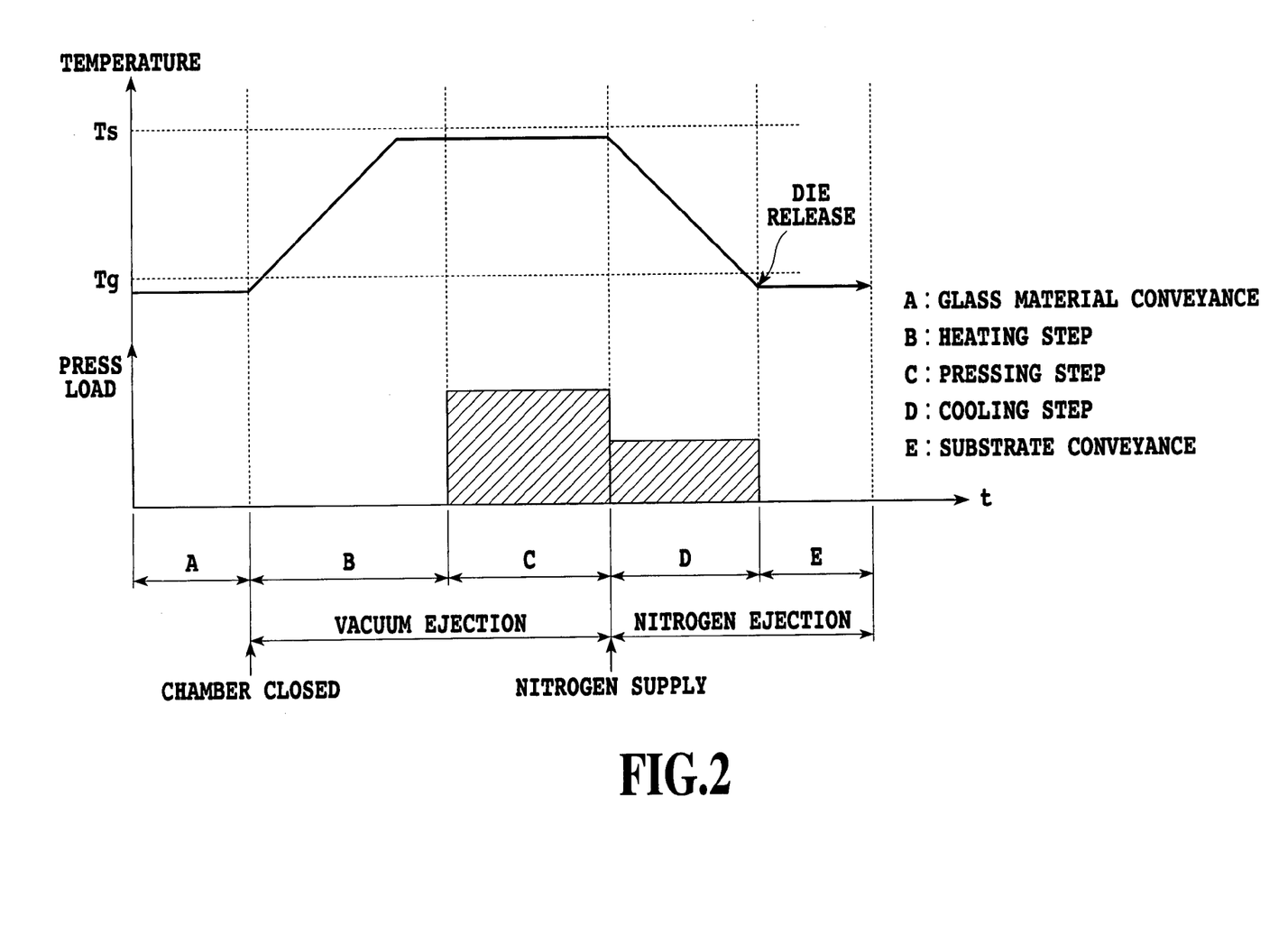
FIG. 2 is a time chart of a molding process according to the embodiment of the present invention.

A conveying arm (not shown) is used to set a glass material 8 in sphere or marble form on a molding surface of the lower die 1b (a period A in FIG. 2). Then, the lower die 1b is moved to an initial position where it locates in front of the tube heater 16. The vacuum pump 11 is then activated to eject the air or gas from the interior to exterior of the chamber 18.

Once a target vacuum of 1 Pa or less is reached, the tube heater 16 and flat heaters 2a and 2b as heating members constituting heating means are activated to heat the glass material 8 and the dies 1a and 1b nearly to the softening point Tg of the glass material 8 while controlling the temperatures of the dies 1a and 1b. At this time, the glass material is maintained at Tg or lower. The dies are maintained at about Tg.

Figure 3:
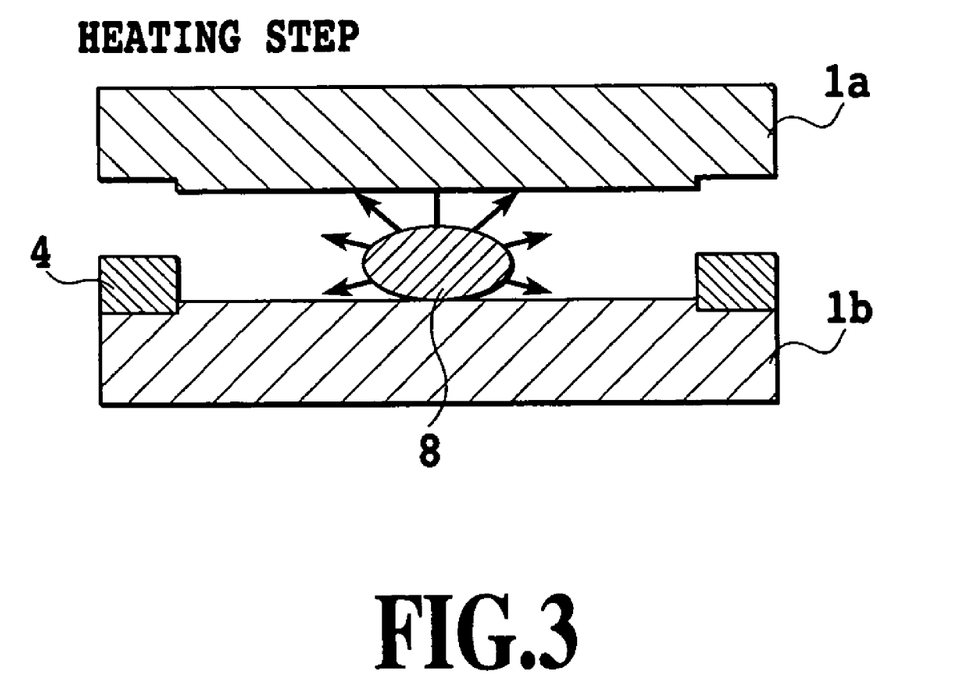
FIG. 3 is a conceptual drawing showing the behavior of a gas generated from a glass material during a heating step.

If dust adheres to the molding surface of the die, it may cause a defect in the resulting substrate. Furthermore, as shown in FIG. 3, when the temperature of the glass is high, a corrosive gas such as water or oxygen is generated from the surface of the glass or its vicinity. Arrows in FIGS. 3 to 5 indicate the behavior of a gas generated from the glass.

In contrast to this, in the present embodiment where heating is performed in a vacuum state, no dust is connected in the chamber 18 (a period B in FIG. 2), thus reducing defects attributed to dust. Furthermore, corrosive gases generated from the glass material 8 are instantaneously and rapidly discharged to the exterior of the chamber 18 by the vacuum pump 11. This hinders the degradation of the molding surfaces of the dies 1a and 1b.

(2) Pressing Step

The heated glass material 8 is held for a predetermined time and is then pressurized via the rod 6 by the pressing machine 5, constituting pressing means. The glass material 8 thus has its thickness regulated by the controlling member 4 so as to be molded into a glass substrate.

During the press or forming step, after the temperature of the dies has reached a set temperature close to the softening point, a load is imposed on the upper and lower dies 1a and 1b to crush the glass material 8. Once the glass material 8 is pressurized and crushed, the upper die 1a abuts against the controlling member 4 provided on the lower die 1b. By adjusting the thickness of the controlling member 4 to the thickness of a product, it is possible to produce glass substrates having thicknesses fixed within a small amount of variations.

Figure 4:
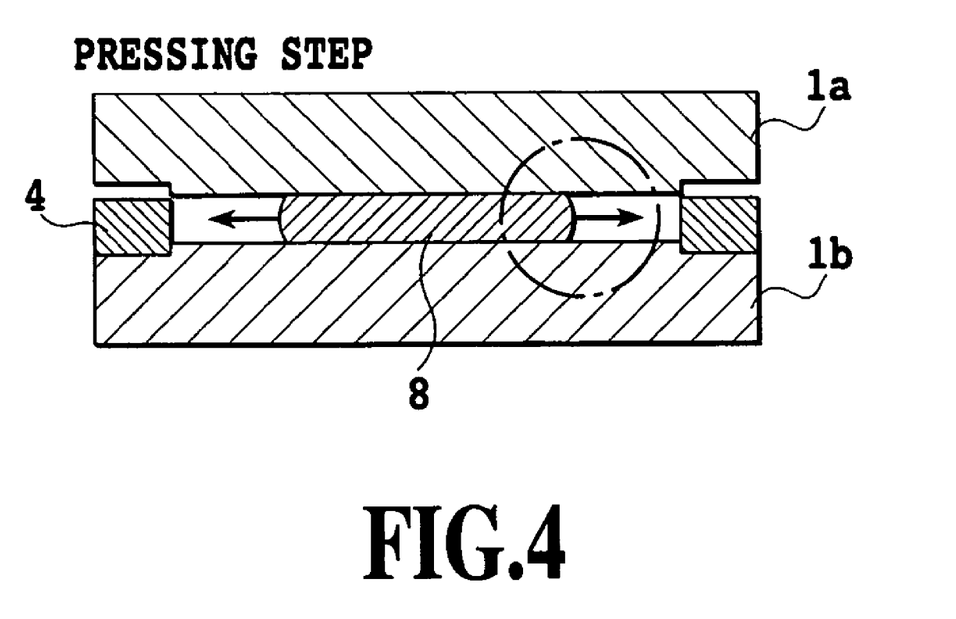
FIG. 4 is a conceptual drawing showing the behavior of the gas generated from the glass material during a pressing step.
Figure 5:
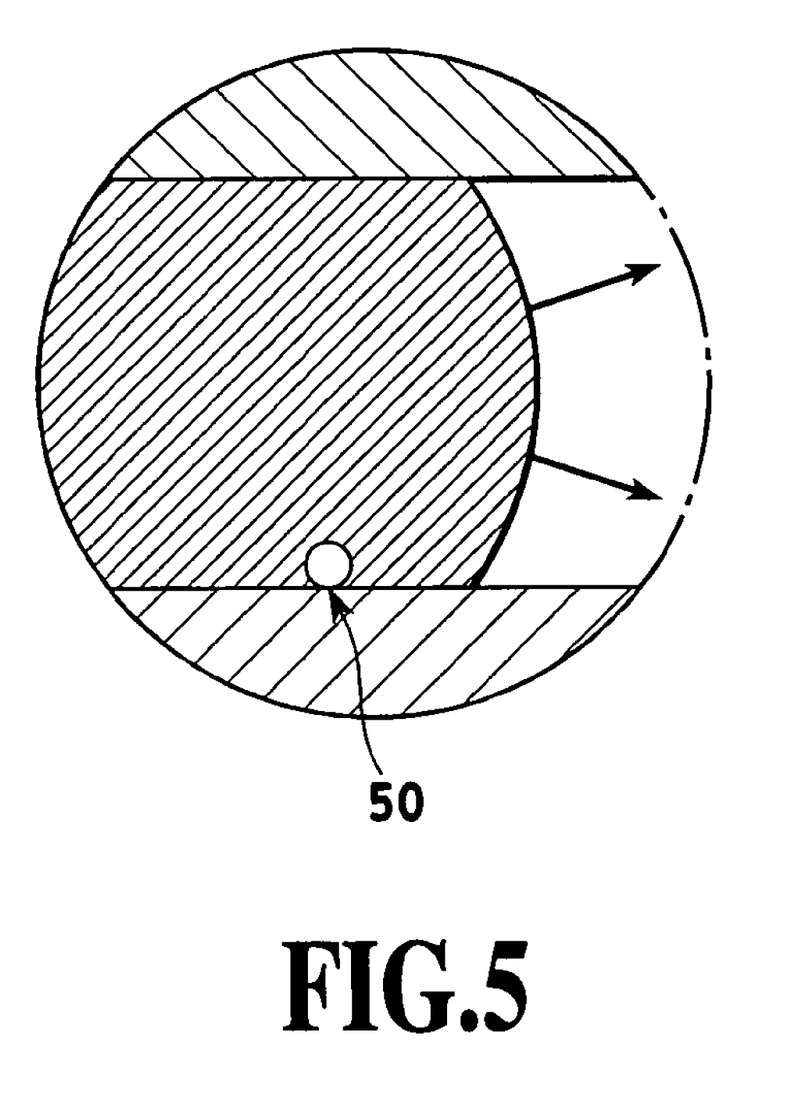
FIG. 5 is an enlarged view of a essential part of the glass material of FIG. 4, showing that bubbles may be generated during molding if the improvement by the present invention is not introduced into the process.
Figure 6:
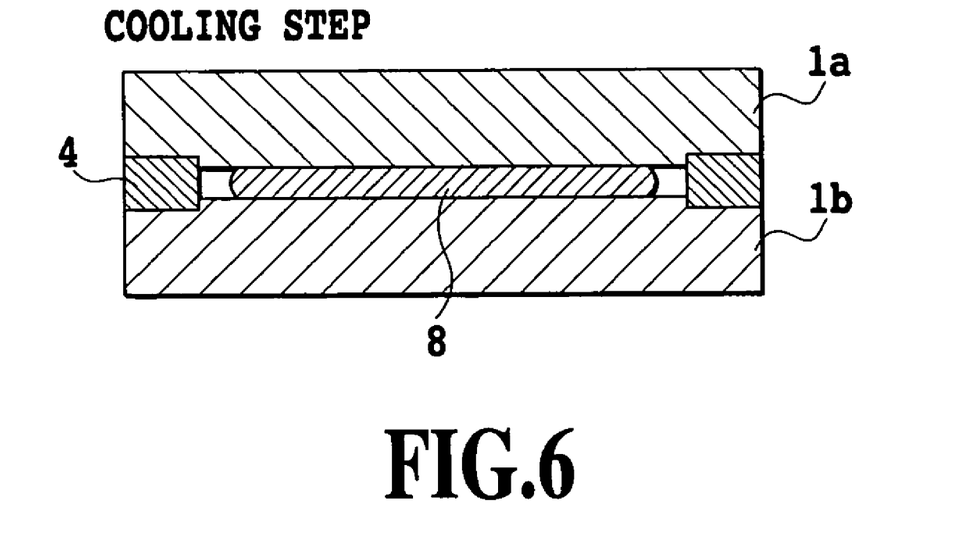
FIG. 6 is a conceptual drawing showing the state of the glass material during a cooling step.

As shown in FIG. 4, when the heated and softened glass is deformed, a gas such as oxygen, water, or a carbonic acid gas is newly generated. When this gas is incorporated into the glass being deformed, a bubble 50 of several micrometers or less, a so-called microbubble, is generated as shown in FIG. 5, and would result in a defect in the resulting medium. Furthermore, the gas would corrode the coating layer on the forming surfaces, thereby degrade the die-release ability and the surface accuracy of the forming surfaces.

In the present embodiment, however, exhaustion of the gas from the chamber 18 is continued until the upper and lower dies 1a and 1b abut against the controlling member 4 to finish the pressing (a period C in FIG. 2). This maintains a vacuum atmosphere in a space containing the dies 1a and 1b and the glass material 8. Thus, a gas generated from the glass material 8 during the pressing step is instantaneously or rapidly diffused, and discharged to the exterior of the chamber 18. This reduces bubble defects and suppresses the degradation of the molding surfaces of the dies 1a and 1b.

(3) Cooling Step and Removal of the Substrate

After being deformed to a desired board thickness by pressing, the material is cooled to the temperature Tg or less (a period D in FIG. 2). For cooling, the water cooling jackets 3a and 3b are pressed against the back surfaces of the dies 1a and 1b, respectively. The water cooling jackets 3a and 3b are controlled by the controller 30 so as to be separated from the flat heaters 2a and 2b, respectively, during heating and pressing, and to be pressed against the back surfaces of the flat heaters 2a and 2b, respectively, during cooling.

During the cooling step, a closed space is present in a cavity composed of the controlling member 4 and the upper and lower dies 1a and 1b between which the molded glass substrate is housed. Accordingly, no floating dust enters the cavity. Moreover, only a small amount of gas is generated from the glass after the deformation has ended. The gas is thus negligible, so that the gas need not be exhausted from the chamber 18 during the cooling step.

Thus, in the present embodiment, to reduce the time required for cooling, an inert gas such as a nitrogen gas (this gas does not react with the dies or their coating agent) is rapidly filled into the chamber to set the pressure in the chamber equal to the ambient pressure after the pressing step has been finished to form a closed space in the cavity composed of the upper and lower dies 1a and 1b and controlling member 4. This improves the heat transfer between both flat heaters 2a and 2b and both dies 1a and 1b and the molded glass material.

The transfer of heat from the dies 1a and 1b to the water cooling jackets 3a and 3b would not efficiently cool the substrate in a vacuum atmosphere, because the vacuum atmosphere serves to offer a significantly large contact thermal resistance. For this reason, after the pressing step has completed, the exhaust from the chamber 18 is stopped, and an inert gas is rapidly filled into the chamber 18. This reduces the thermal resistance of the interfaces between both dies 1a and 1b and the respective water cooling jackets 3a and 3b. It is thus possible to make the in-plane temperature distribution of the dies 1a and 1b uniform and to reduce the time required for cooling.

Thus, in the chamber 18 set to have an ambient pressure atmosphere using the inert gas, the water cooling jackets 3a and 3b, made of an appropriate thermal conductive material, are pressed against the dies 1a and 1b or the flat heaters 2a and 2b for cooling and the subsequent die release. Consequently, a cooling operation can be quickly performed so as to achieve a uniform temperature. This enables the productive manufacture of high-quality and inexpensive substrates that are unlikely to be warped.

The molded substrate and the upper and lower dies 1a and 1b are cooled to the temperature Tg or lower. Then, the upper and lower dies 1a and 1b are opened, and the molded substrate is removed from them. A transfer machine (not shown) is then used to remove the molded glass substrate from the chamber 18. Subsequently, a conveying machine is used to deliver the substrate to the subsequent step in which, for example, the inner and outer peripheries of the substrate are shaped (a period E in FIG. 2).

As described above, in the present embodiment, the water cooling jackets 3a and 3b are adapted to be elevated and lowered by the driving mechanism 27, so that the water cooling jackets 3a and 3b can selectively contact with, and separate from, the flat heaters 2a and 2b, respectively. This improves the uniformity of the in-plane temperatures of the dies 1a and 1b and glass material 8. It is thus possible to suppress the deformation of the substrate caused by non-uniform cooling, thus providing a suitably flat substrate. Furthermore, the uniform in-plane temperature eliminates the need to wait for a long time before the in-plane temperature is stabilized, thus permitting a reduction of the cooling time.

In the present embodiment, the water cooling jackets 3a and 3b contact with the dies 1a and 1b via the flat heaters 2a and 2b, respectively. Accordingly, the interior of the chamber 18 can be rapidly cooled by cooling the flat heaters 2a and 2b, a heat source. However, it should be noted that in the present invention, the apparatus may be designed so that the water cooling jackets 3a and 3b contact directly with the dies 1a and 1b, respectively.

Furthermore, in the present invention, use of the radiating tube heater 16, which is arranged opposite the outer peripheral sides of the dies 1a and 1b, enables to heat the glass material 8 more efficiently than the flat heaters 2a and 2b heating the glass material 8 via dies 1a and 1b, respectively, even in a vacuum atmosphere that generally hinders heat from being sufficiently transferred between materials. This enables a reduction in the time required to heat the glass material 8.

Moreover, in the present embodiment, a vacuum atmosphere is maintained during heating after the glass material 8 has been placed on the die 1b and before a rise in temperature is stopped. This serves to reduce the amount of dust floating in the atmosphere around the dies 1a and 1b. This in turn reduces defects attributed to dust.

Furthermore, in the present embodiment, a cooling operation is performed in an inert gas atmosphere instead of a vacuum. Therefore, cooling efficiency can be improved compared to cooling in a vacuum atmosphere where heat is transferred at a lower speed. Moreover, while a vacuum may contribute to increase of the frictional force exerted between materials (in this case, the dies and the molded glass), a cooling operation is performed in an inert gas atmosphere in the present embodiment—instead of a vacuum—so that the molded glass can be more appropriately released from the dies. This prevents the incomplete release of the molded glass and reduces inconveniences such as cracks in the glass.

Moreover, in the present embodiment, a closed space is formed in the cavity in which the molded substrate is housed. It is thus possible to avoid the entry of dust from the atmosphere even without vacuum pumping during cooling.

Furthermore, in the present embodiment, the process is executed on the same dies from the start of a rise in temperature until the substrate is cooled to the temperature Tg or lower. This eliminates the needs for a step of contacting with the glass material 8 or conveying it during the process. It is thus possible to prevent defects or distortions caused by a chuck, to enable the use of a complicated substrate shape, and to reduce defects.

According to experimentations using the water cooling jackets 3a and 3b together with the apparatus configured as shown in FIG. 1, the speed at which the dies 1a and 1b were cooled was 10° C./min in a vacuum atmosphere and 24° C./min in a nitrogen gas. It was thus confirmed that the cooling speed can be improved by filling the gas in the chamber during cooling.

As described above, the method and apparatus according to the present embodiment enable the manufacture of a glass substrate and a magnetic disk which are dense, reliable, and inexpensive.

The present invention has been described with reference to the specific embodiments. However, it is obvious to those skilled in the art that the present invention is not limited to the disclosed embodiments but covers various other modifications, variations, substitutions, and broad equivalents without departing the spirits and scope of the claims set forth below.

What is claimed is:

1. A method of manufacturing a glass substrate for a storage medium by arranging and pressing a glass material between an upper die and a lower die to form a glass substrate, said method comprising:
   a heating step of heating said glass material remaining arranged between said upper die and said lower die;
   a pressing step of pressing said heated glass material via said upper and lower dies to precisely transfer molding surfaces of said upper and lower dies to the glass material to form a desired substrate; and
   a cooling step of having, after said pressing step, an upper cooling member contact said upper die and a lower cooling member contact said lower die to cool said dies with said molded glass material remaining arranged between said upper die and said lower die, and wherein during said heating step and said pressing step, a vacuum atmosphere is maintained in a space containing said dies and said glass material, and wherein when said pressing step has completed, an inert gas is filled in said space to set a pressure in said space equal to an ambient pressure, before said cooling step is executed.

2. A method of manufacturing a glass substrate for a storage medium as claimed in claim 1, wherein said cooling step includes a step of pressurizing said glass material via said upper die and said lower die until the temperature of said glass material drops to reach its glass transition point.

3. An apparatus for manufacturing a glass substrate for a storage medium by arranging and pressing a glass material between an upper die and a lower die to form a glass substrate, said apparatus comprising:

heating means for heating said glass material remaining arranged between said upper die and said lower die;

pressing means for pressing said heated glass material via said upper and lower dies to precisely transfer molding surfaces of said upper and lower dies to the glass material to form a desired substrate;

cooling means for having an upper cooling member contact said upper die and a lower cooling member contact said lower die so as to perform cooling of said molded glass material remaining arranged between said upper and lower dies;

accommodating means for accommodating said upper and lower dies, said heating member, and said cooling members; and     exhausting and gas filling means for exhausting and filling a gas from and into a space formed by said accommodating means,     wherein said exhaust and gas filling means exhausts the gas until said pressing means is used to form a closed space for molding between said upper die and said lower die, and after said pressing means has been used to form the closed space for molding between said upper die and said lower die, an inert gas is filled in said space to set a pressure in said space equal to an ambient pressure, and     wherein said cooling means cools said glass material after the inert gas is filled in said space to set the pressure in said space equal to the ambient pressure.

4. An apparatus for manufacturing a glass substrate for a storage medium as claimed in claim 3, wherein said cooling members comprise an upper cooling jacket and a lower water cooling jacket that can selectively contact with, and separate from, surfaces of the upper and lower dies, respectively, which surfaces are opposite to said molding surfaces, and wherein said cooling is performed by having said upper and lower water cooling jackets contact the surfaces of said upper and lower dies, respectively, which surfaces are opposite to said molding surfaces.

5. An apparatus for manufacturing a glass substrate for a storage medium as claimed in claim 3, wherein said heating means includes a radiating heater arranged around said upper and lower dies.

\* \* \* \* \*